US012688533B2

(12) United States Patent
Koganti et al.

(10) Patent No.: US 12,688,533 B2
(45) Date of Patent: Jul. 21, 2026

(54) METHOD AND SYSTEM FOR DATA SECURITY AND VERIFICATION

(71) Applicant: Lattice Industries, Inc., Greenville, DE (US)

(72) Inventors: Krishna Prasad Koganti, Cupertino, CA (US); Kevin Siegel, Mountain View, CA (US); Jennifer Mary Schmitz, Orinda, CA (US)

(73) Assignee: Lattice Industries, Inc., Greenville, DE (US)

( * ) Notice: Subject to any disclaimer, the term of this patent is extended or adjusted under 35 U.S.C. 154(b) by 160 days.

(21) Appl. No.: 18/554,782

(22) PCT Filed: Apr. 22, 2022

(86) PCT No.: PCT/US2022/025962
§ 371 (c)(1),
(2) Date: Oct. 10, 2023

(87) PCT Pub. No.: WO2022/226315
PCT Pub. Date: Oct. 27, 2022

(65) Prior Publication Data
US 2024/0202827 A1 Jun. 20, 2024

Related U.S. Application Data

(60) Provisional application No. 63/179,034, filed on Apr. 23, 2021, provisional application No. 63/179,009, filed on Apr. 23, 2021.

(51) Int. Cl.
*G06Q 40/04* (2012.01)
*H04L 9/08* (2006.01)
*H04L 9/32* (2006.01)

(52) U.S. Cl.
CPC ........... *G06Q 40/04* (2013.01); *H04L 9/0825* (2013.01); *H04L 9/3234* (2013.01); *G06Q 2220/12* (2013.01)

(58) Field of Classification Search
None
See application file for complete search history.

(56) References Cited

U.S. PATENT DOCUMENTS

| 5,873,071 A | * | 2/1999 | Ferstenberg | ........... G06Q 40/06 705/36 R |
| 6,907,402 B1 | * | 6/2005 | Khaitan | ................. G06Q 40/04 705/37 |

(Continued)

FOREIGN PATENT DOCUMENTS

| EP | 3446436 B1 | * | 1/2021 | ......... G06Q 20/4014 |
| WO | WO-2012150491 A1 | * | 11/2012 | ........... G06Q 20/045 |

OTHER PUBLICATIONS

Application No. PCT/US2022/025962 , International Search Report and Written Opinion, Mailed On Aug. 1, 2022, 9 pages.

(Continued)

*Primary Examiner* — Jahed Ali
(74) *Attorney, Agent, or Firm* — Kilpatrick Townsend

(57) ABSTRACT

A method includes transmitting a first encrypted data contract and an encrypted token to a data consumer computer, which decrypts the first encrypted data contract with a private key to obtain a data contract, encrypts the data contract with a public key to create a second encrypted data contract, and transmits it and the encrypted token to the data producer computer. The data producer computer decrypts the second encrypted data contract and with the private key, decrypts the encrypted token with the private key, encrypts the token and the data contract with the public key of the data exchange computer to form a third encrypted data contract, and transmits them to the data exchange computer.

(Continued)

The data exchange computer decrypts the third encrypted data contract and the encrypted token. It verifies the token and facilitates an action of the data contract.

20 Claims, 5 Drawing Sheets

(56)                    References Cited

U.S. PATENT DOCUMENTS

| | | | | |
|---|---|---|---|---|
| 7,840,462 | B2 * | 11/2010 | Hansen ................. | G06F 16/951 |
| | | | | 705/28 |
| 9,344,285 | B2 * | 5/2016 | Gorecki ................ | H04L 63/045 |
| 9,490,980 | B2 * | 11/2016 | Deshpande ............ | H04L 63/08 |
| 10,192,267 | B2 | 1/2019 | Annunziata | |
| 10,382,203 | B1 * | 8/2019 | Loladia ................... | H04L 63/06 |
| 10,924,466 | B2 * | 2/2021 | Biyani .................... | G06F 21/64 |
| 11,276,118 | B1 * | 3/2022 | Schmitz ................. | G06Q 40/04 |
| 11,816,731 | B2 | 11/2023 | Schmitz et al. | |
| 12,125,104 | B2 | 10/2024 | Schmitz et al. | |
| 2007/0220279 | A1 | 9/2007 | Northcutt et al. | |
| 2008/0215477 | A1 * | 9/2008 | Annunziata ............ | G06Q 40/04 |
| | | | | 705/37 |
| 2010/0257368 | A1 | 10/2010 | Yuen | |
| 2013/0282588 | A1 * | 10/2013 | Hruska .................. | G06Q 20/40 |
| | | | | 705/67 |
| 2014/0032267 | A1 | 1/2014 | Smith et al. | |
| 2014/0068267 | A1 | 3/2014 | Le Saint et al. | |
| 2014/0279556 | A1 * | 9/2014 | Priebatsch ........... | G06Q 20/385 |
| | | | | 705/67 |
| 2014/0298030 | A1 * | 10/2014 | Akiyama .............. | H04L 63/062 |
| | | | | 713/172 |
| 2015/0363775 | A1 * | 12/2015 | Li ........................... | H04L 9/321 |
| | | | | 705/71 |
| 2016/0149875 | A1 * | 5/2016 | Li ........................... | H04L 63/08 |
| | | | | 713/168 |
| 2016/0275309 | A1 * | 9/2016 | Austin ................ | G06F 21/6254 |
| 2017/0134168 | A1 * | 5/2017 | Barnett ................. | H04L 9/0861 |
| 2017/0359343 | A1 * | 12/2017 | Sterl .................... | H04L 63/0876 |
| 2018/0234787 | A1 * | 8/2018 | Karimli ................... | H04W 4/70 |
| 2019/0149633 | A1 * | 5/2019 | Evans ..................... | H04L 67/63 |
| | | | | 709/217 |
| 2019/0236627 | A1 | 8/2019 | Christensen | |
| 2019/0349426 | A1 * | 11/2019 | Smith ................... | H04L 9/3239 |
| 2020/0162259 | A1 * | 5/2020 | Wang .................... | H04L 9/3263 |
| 2020/0242690 | A1 * | 7/2020 | Wang ................... | H04L 9/0637 |
| 2020/0380509 | A1 * | 12/2020 | Billman ................. | G06Q 20/32 |
| 2020/0380624 | A1 * | 12/2020 | Turgman .............. | H04L 63/083 |
| 2021/0058353 | A1 * | 2/2021 | Creech .................. | H04L 51/214 |
| 2021/0090066 | A1 * | 3/2021 | Beye ...................... | G06Q 20/02 |
| 2021/0209237 | A1 * | 7/2021 | Gurin ........................ | H04L 9/14 |
| 2021/0367767 | A1 | 11/2021 | Saravanan et al. | |
| 2022/0156732 | A1 | 5/2022 | Powell et al. | |

OTHER PUBLICATIONS

Shi et al., "A Trading Model Based on Legal Contracts Using Smart Contract Templates", Communications in Computer and Information Science, vol. 1156, Dec. 7, 2019, pp. 446-458.

* cited by examiner

100

130A
P(PUBKEY)

130B
P(PVTKEY)

160A
FIRST DATA BROKER COMPUTER

130
DATA PRODUCER COMPUTER

140
DATA SOURCE

110A
L(PUBKEY)

110B
L(PVTKEY)

DATA EXCHANGE COMPUTER
110

BROKER COMMUNITY
160

160B
SECOND DATA BROKER COMPUTER

150
DATA CONSUMER COMPUTER

150A
C(PUBKEY)

150B
C(PVTKEY)

```
# Sample iCDC contract in YAML.
Exchange: LiDx

Contract Type: IoT Sensor Data I
Contract ID: 6YF85Z000001
iCDC Ver:

# This is iCDC version tag. For available versions see https://<>
    version: v0.5.1
Contract:
    # This is where contract terms, pricing and execution instructions specified
    Contract_name: PGE_Smartmeter_residential_region_2010_realtime
    Contract_id: 6YF85Z000001
    Contract exp date: 12-31-2021
    Contract terms:
        term length: six months
        feed frequecy: real time
        min accounts: 2000
        # add additional data metrics here
        PII level: 0 # refer to PII level specification https://<>
    contract pricing:
        pricing catogery: post delivery
        contract cost: $1000
        pricing date: 01-01-2011
        producer id: pge_1234
        Consumer id: solarsolutions_7890
    data spec filename: pge.Smdata.json
    data spec file link: https://<> iCDC_tokens:
        tok_1: 7jhsdfbsahf68
        tok_2: 2io8ydy96csa3
    iCDC_keys:
        producer pubkey: "Y0zt37HgOx-BY7SQjYVmrqhPkO44li2Jcb9yydUDPfE"
        consumer pubkey: "t9QZortk81zjH3y41MBO_UFDO_X0crAquNrkjZDrf9"
        LiDx pubkey:     "vGo3eU16ag9zRkJ4AK8ZUZrjbtp5xWK0LyFMNT893"

verify actions: # list actions for consumers, producers and the exchange
    clearing actions: # clearing terms & instructions
    settlement actions: # settlement terms & instructions
```

FIG. 5

METHOD AND SYSTEM FOR DATA SECURITY AND VERIFICATION

CROSS-REFERENCE TO RELATED APPLICATIONS

This application is a US National Phase of PCT application No. PCT/US2022/025962, filed Apr. 22, 2022, claiming priority to U.S. Provisional Application No. 63/179,034, filed on Apr. 23, 2021, and 63/179,009, filed on Apr. 23, 2021, which are all herein incorporated by reference in their entirety for all purposes.

BACKGROUND

Many current computer systems and networks generate large amounts of data. Such data can be analyzed, and the analyzed data can be informative. For example, road sensors on highways can provide data regarding the number of cars that are detected by the sensors. Such information can be used to perform many beneficial activities such as determining traffic density or traffic patterns.

Such data, however, is not always accessible to others who could benefit from it. For example, in the above example, an entity that provides road repair services may be interested in traffic sensor data. The entity could use the data from the traffic sensors to monitor the condition of the road and predict time periods future potential repairs of the road by using the traffic sensor data. However, because such data is not generally available to obtain by entities that might wish to obtain it, the use of such data is limited. Further, even if an entity were to determine the entity which manages such sensors, the process for obtaining such data would be cumbersome as it may involve various discussions and negotiations. The infrastructure to provide for efficient and secure ways for various entities to obtain such data does not exist.

Further, existing data exchange systems that involve multiple parties to an interaction are not particularly scalable. For example, one specific central data exchange computer of a first exchange may communicate with several client computers using one data exchange protocol and/or security protocol, while another central data exchange computer of a different second exchange may operate using a different data exchange protocol or security protocol. As such, the data that is exchanged in the first exchange may not be used in the second exchange, and vice-versa. As a result, it is difficult to scale existing exchange systems to that a large number of users can easily participate in an exchange.

Embodiments of the invention address these and other problems, individually and collectively.

BRIEF SUMMARY

Some embodiments of the invention can include the use of cryptographic protocols to secure communications for agreements for data consumers to obtain data from data producers. Other embodiments of the invention can relate to efficient transfer of rights or values in such agreements to others that may have interest in obtaining them.

One embodiment of the invention includes a method comprising: transmitting, by a data exchange computer, a first encrypted data contract and one or more encrypted tokens to a data consumer computer, wherein the data consumer computer decrypts the first encrypted data contract with a private key of the data consumer computer to obtain a data contract, and encrypts the data contract with a public key of a data producer computer to create a second encrypted data contract, and transmits the second encrypted data contract and the encrypted one or more tokens to the data producer computer, wherein after receiving the second encrypted data contract and the encrypted one or more tokens, the data producer computer initiates providing data mentioned in the data contract to the data consumer computer, and the data producer computer decrypts the second encrypted data contract with the private key of the data producer computer to obtain the data contract, decrypts the encrypted one or more tokens with the private key of the data producer computer to obtain one or more tokens, encrypts the one or more tokens and encrypts the data contract with the public key of the data exchange computer to form a third encrypted data contract, and transmits the encrypted one or more tokens and the third encrypted data contract to the data exchange computer; receiving, by the data exchange computer, the encrypted one or more tokens and the third encrypted data contract; decrypting, by the data exchange computer, the third encrypted data contract and the encrypted one or more tokens with the private key of the data exchange computer; verifying, by the data exchange computer, the one or more tokens; and facilitating, by the data exchange computer, an action of the data contract.

Another embodiment of the invention includes a data exchange computer comprising: a processor; and a non-transitory computer readable medium, the non-transitory computer readable medium comprising code, executable by the processor for performing operations comprising: transmitting a first encrypted data contract and one or more encrypted tokens to a data consumer computer, wherein the data consumer computer decrypts the first encrypted data contract with a private key of the data consumer computer to obtain a data contract, and encrypts the data contract with a public key of a data producer computer to create a second encrypted data contract, and transmits the second encrypted data contract and the encrypted one or more tokens to the data producer computer, wherein after receiving the second encrypted data contract and the encrypted one or more tokens, the data producer computer initiates providing data mentioned in the data contract to the data consumer computer, and the data producer computer decrypts the second encrypted data contract with the private key of the data producer computer to obtain the data contract, decrypts the encrypted one or more tokens with the private key of the data producer computer to obtain one or more tokens, encrypts the one or more tokens and encrypts the data contract with the public key of the data exchange computer to form a third encrypted data contract, and transmits the encrypted one or more tokens and the third encrypted data contract to the data exchange computer; receiving the encrypted one or more tokens and the third encrypted data contract; decrypting the third encrypted data contract and the encrypted one or more tokens with the private key of the data exchange computer; verifying the one or more tokens; and facilitating an action of the data contract.

Another embodiment includes a data exchange system comprising: a data exchange computer comprising a processor, and a non-transitory computer readable medium, the non-transitory computer readable medium comprising code, executable by the processor for performing operations comprising: transmitting a first encrypted data contract and one or more encrypted tokens to a data consumer computer, wherein the data consumer computer decrypts the first encrypted data contract with a private key of the data consumer computer to obtain a data contract, and encrypts the data contract with a public key of a data producer computer to create a second encrypted data contract, and transmits the second encrypted data contract and the encrypted one or more tokens to the data producer computer, wherein after receiving the second encrypted data contract and the encrypted one or more tokens, the data producer computer initiates providing data mentioned in the data contract to the data consumer computer, and the data producer computer decrypts the second encrypted data contract with the private key of the data producer computer to obtain the data contract, decrypts the encrypted one or more tokens with the private key of the data producer computer to obtain one or more tokens, encrypts the one or more tokens and the data contract with the public key of the data exchange computer to form a third encrypted data contract, and transmits the encrypted one or more tokens and the third encrypted data contract to the data exchange computer; receiving the encrypted one or more tokens and the third encrypted data contract; decrypting the third encrypted data contract and the encrypted one or more tokens with the private key of the data exchange computer; verifying the one or more tokens; and facilitating an action of the data contract.

Another embodiment includes a method comprising: generating, by a data exchange computer, a plurality of data contracts for a delivery of data, the plurality of data contracts executed between a plurality of data producers operating a plurality of data producer computers and a plurality of data consumers operating a plurality of data consumer computers, respectively; storing, by the data exchange computer, the plurality of data contracts; and facilitating, by the data exchange computer, trading of the plurality of data contracts with a plurality of participants interacting with the data exchange computer.

Another embodiment of the invention includes a data exchange computer comprising: a processor; and a non-transitory computer readable medium comprising code executable by the processor for implementing operations comprising: generating a plurality of data contracts for a delivery of data, the plurality of data contracts executed between a plurality of data producers operating a plurality of data producer computers and a plurality of data consumers operating a plurality of data consumer computers, respectively, storing the plurality of data contracts; and facilitating trading of the plurality of data contracts with a plurality of participants interacting with the data exchange computer.

These and other embodiments are described in further detail below.

BRIEF DESCRIPTION OF THE DRAWINGS

FIG. 5 shows elements that may be present in a data contract according to embodiments of the invention.

DETAILED DESCRIPTION

Figure 1:
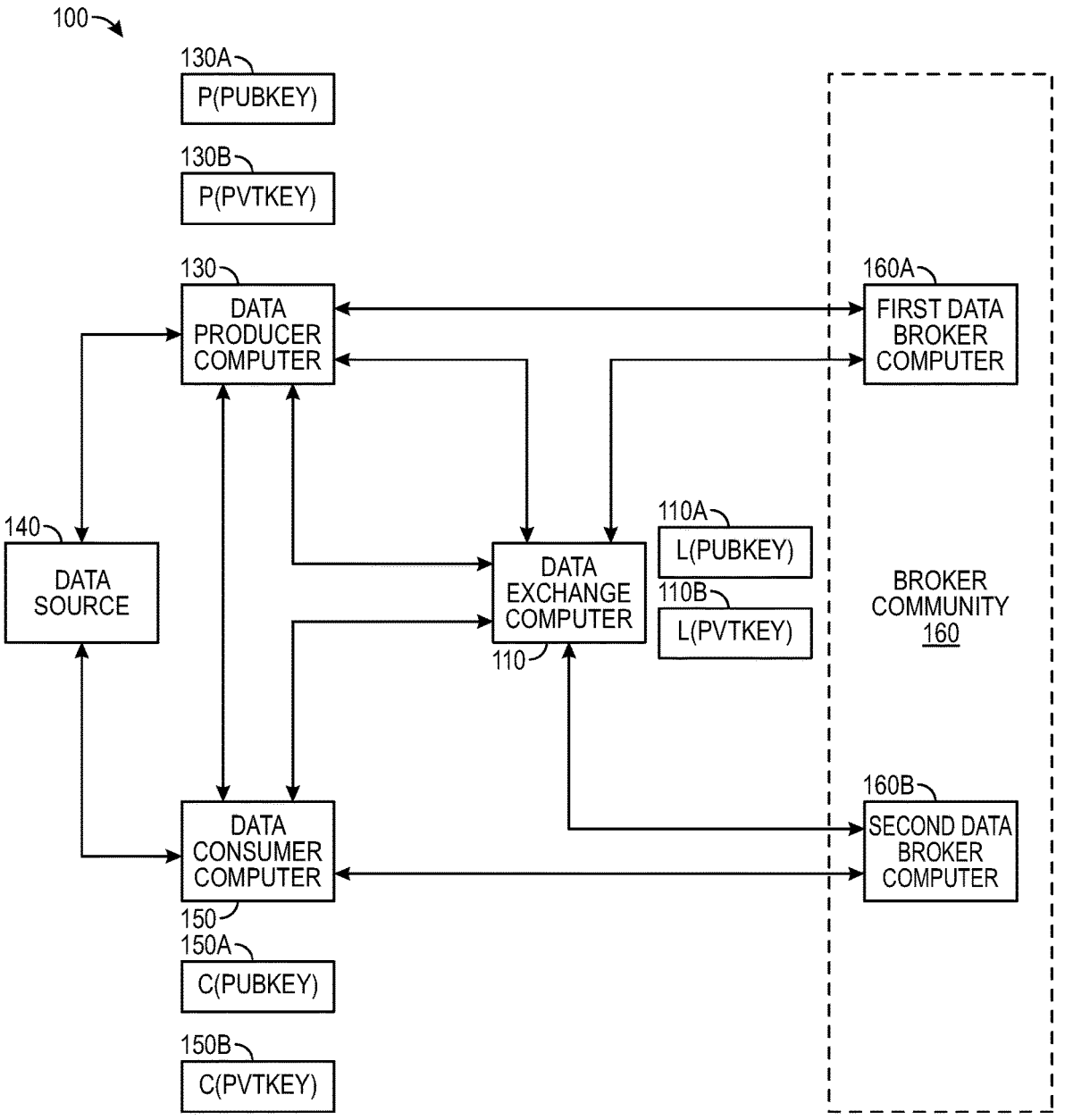
FIG. 1 shows a system diagram illustrating a system according to embodiments of the invention.

Prior to discussing embodiments of the invention, some terms can be discussed.

The term "public/private key pair" may include a pair of linked cryptographic keys. A public key may be used for functions such as encrypting a message to send to an entity that holds the private key, or for verifying a digital signature which was supposedly made by the entity. The private key may be used for functions such as decrypting a received message or applying a digital signature. Public and private keys may be in any suitable format, including those based on RSA or elliptic curve cryptography (ECC).

A "blockchain" can be a distributed database that maintains a continuously-growing list of records secured from tampering and revision. A blockchain may include a number of blocks of interaction records. Each block in the blockchain can contain also include a timestamp and a link to a previous block. Stated differently, interaction records in a blockchain may be stored as a series of "blocks," or permanent files that include a record of a number of interactions occurring over a given period of time. Blocks may be appended to a blockchain by an appropriate node after it completes the block and the block is validated. Each block can be associated with a block header. In embodiments, a blockchain may be distributed, and a copy of the blockchain may be maintained at each full node in a verification network. Any node within the verification network may subsequently use the blockchain to verify interactions.

A "blockchain network" may be any set of nodes (computer systems and components) configured to provide verification for interactions. A blockchain network may comprise a distributed computing environment utilizing several nodes that are interconnected via communication links, using one or more computer networks or direct connections. A blockchain network may be implemented over any appropriate network, including an intranet, the Internet, a cellular network, a local area network or any other such network or combination thereof.

The term "verification" and its derivatives may include a process that utilizes information to determine whether an underlying subject is valid under a given set of circumstances. Verification may include any comparison of information to ensure some data or information is correct, valid, accurate, legitimate, and/or in good standing.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments of the invention can be used in the context of a data contract for the purchase of digital data. The data contract can be traded in its various forms on a data exchange platform. The data exchange platform can be characterized as a commodity contracts trading platform.

Embodiments can provide for a new construct or data contract, which can be referred to as an immutable commoditized data contract (iCDC). The immutable commoditized data contract can be part of the data exchange process and can be a legally binding agreement between the exchange participants.

Some characteristics of the immutable commoditized data contracts may include the following. First, the immutable commoditized data contracts are immutable. That is, once an immutable commoditized data contract is created and released to a marketplace, the immutable commoditized data contract cannot be altered during its lifespan. Second, the immutable commoditized data contracts can be indemnified. The immutable commoditized data contracts can be underwritten by operators of the data exchange platform within a policy framework set forth by a self-governing body. Third, the immutable commoditized data contracts can be standardized, and may have standardized data fields. The immutable commoditized data contracts can comply with privacy and data protection laws and any policies of the self-governing body. Fourth, the immutable commoditized data contracts can be digitally exchangeable. An immutable commoditized data contract can have in-built cryptographic mechanisms to make it suitable for online exchange between data producers, data consumers, and the exchange computer in the data exchange platform.

An additional feature of immutable commoditized data contracts is exclusivity. In some embodiments, the data producer (e.g., the seller) can guarantee exclusive delivery of the data described in the immutable commoditized data contract to the data consumer (e.g., the buyer). Also, in some embodiments, the immutable commoditized data contracts can also have resale rights. In some embodiments, the seller grants the buyer permission to resell the data free of any conditions to other members of the data exchange through a new immutable commoditized data contract. In some embodiments, the buyer may not have the right to place the immutable commoditized data contract, or the data described in the immutable commoditized data contract in the public domain or to freely distribute the data described in the contract to non-members of the data exchange.

In some embodiments, the immutable commoditized data contracts may also specify jurisdiction constraints on the data described in the immutable commoditized data contracts. For example, the data producer (i.e., the seller of data) can include ISO State and Country Codes, or similar geographical location information where the buyer is allowed to use or process the data described in an immutable commoditized data contract. Otherwise, it can be presumed that the data can be used without geographical restrictions. The immutable commoditized data contracts can be used with both centralized as well as non-centralized data processing systems and networks.

As noted above, in embodiments of the invention, the commodity for delivery specified in the immutable commoditized data contracts is digital data. In some embodiments, the delivered data can be in its original raw form as provided by the data producer and is not altered. In other embodiments, the data that is produced by the data producer can be pre-processed (e.g., normalized or filtered) in some manner.

The data delivery requirements can vary in embodiments of the invention. In some embodiments, the delivery requirements may be defined by a start date and time, and an end date and time. In some embodiments, the data that is purchased by a data consumer can also be archived. The start and end date and times can correspond to a time-period when the data would be available, and there can be a post-delivery period for optional downloads.

In embodiments of the invention, the method of delivery can be either (1) in real-time; or (2) as a bulk download. In some instances, the deliveries of data can occur via API interfaces. At data consumer's option, such delivery can be made by any of the following methods: in real-time (1) through gateway API interfaces; (2) by downloading through Web interfaces; or (3) by optionally being delivered by archiving the data.

In embodiments of the invention, the standard process for data delivery for immutable commoditized data contracts can use a three-way verification and confirmation procedure. A holder of an open immutable commoditized data contract can receive delivery of the data associated with an immutable commoditized data contract by performing at least following the steps, either directly or through their clearing members. First, the data consumer (e.g., the user of data) obtains the immutable commoditized data contract and one or more verification token(s) associated with the immutable contract from a data exchange computer (e.g., via an API or application programming interface), and then presents the immutable commoditized data contract, along with the verification token(s) associated with the immutable commoditized data contract to the data producer (e.g., the seller of data). Second, the data producer (e.g., the seller of data) verifies the token(s) and delivers the data to the data consumer per the contract terms and via the agreed upon delivery methods. Third, the data producer (e.g., the seller of data) presents the token(s) to the data exchange computer (which may alternatively be referred to as a Contract Management Service (CMS)) for settlement of the contract. The data producer may receive the payment associated with the contract in the settlement of the contract.

In some embodiments of the invention, sensors and sensor network aggregators can post data in real-time to a data exchange computer using an API specification for data delivery. As noted above, the data exchange computer can generate data access tokens (DATs) or "tokens" for various time windows and content parameter sets. The tokens can be made available on the data exchange computer where immutable commoditized data contracts are created per data consumers' requests. Each contract can be accompanied by one or more tokens. The one or more tokens can serve as proof that the contract was created by the data exchange computer.

FIG. 1 shows a high-level diagram illustrating a system according to embodiments. The system may include a data exchange computer 120, a data producer computer 130 operated by a data producer, a data source 140, a data consumer computer 150 operated by a data consumer, and first and second data broker computers 160A, 106B operated by data brokers. The data producer computer 130, the data consumer computers 150, and the first and second data broker computers 160A, 106B may be in operative communication with the data exchange computer 120. It is understood that FIG. 1 shows a small number of components for purposes of illustration. However, embodiments of the invention can include many data producer computers, many data user computers, many data sources, and many data broker computers. Embodiments of the invention are not limited to the number of computers illustrated in FIG. 1.

The components in the system in FIG. 1 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); and Secure Hypertext Transfer Protocol (HTTPS).

As shown in FIG. 1, the data exchange computer 110 be in communication with the data producer computer 130, the data consumer computer 150, and the data broker computers 160A, 106B. The data exchange computer 110 can perform functions including generating contracts, generating tokens, verifying tokens, collecting, processing, and/or storing data from data producers, etc. Further details regarding the data exchange computer 110 are provided below. The data exchange computer 110 can also have a public key 110A and a corresponding private key 110B associated with it. The data exchange computer 110 can store the public key 110A and the private key 110B. The private key 110B is only accessible to the data exchange computer 110. The data exchange computer 110 can generate the public/private key pair 110A, 110B using any suitable known cryptographic key generation algorithms.

As shown in FIG. 1, the data producer computer 130 can be operated by a data producer, which also operates the data source 140. The data source 140 may include any suitable type of sensor devices and may produce any suitable type of data. For example, the data source 140 could be devices such as sensors on windmills on a windfarm, sensors in one or more vehicles such as one or more automobiles, weather sensors, road sensors, appliance sensors, electric sensors, etc. In some cases, the data producer operating the data producer computer 130 could refine or process (e.g., normalize, supplement, etc.) any data coming from the data source 140. The data producer computer 130 can be associated with a data consumer public key 130A and a corresponding data consumer private key 130B. The data consumer private key 130B can be stored by the data producer computer 130 and is only known to the data producer computer 130. The data producer computer 110 can generate the public/private key pair 130A, 130B using any suitable known cryptographic key generation algorithms.

The data consumer computer 150 can be operated by a data consumer, which may be any suitable entity (e.g., a machine or human operating a computational device) which can use the data that is coming from the data source 140 and/or the data producer operating the data producer computer 130. Examples of data consumers may include governmental entities, individuals, corporations, machines that use the data, etc. The data consumer computer 150 can be associated with a data consumer public key 150A and a corresponding data consumer private key 150B. The data consumer private key 150B is only known to the data consumer computer 150 and can be stored on the data consumer computer 150. The data consumer computer 150 can generate the public/private key pair 150A, 150B using any suitable known cryptographic key generation algorithms.

As shown in FIG. 1, the data producer computer 130 and the data consumer computer 150 can be in communication with the data exchange computer 120, and they may also be in communication with each other. The communications between the data producer 130 and the data consumer 150, and the data exchange computer 120, can include contract verification, contract settlement, and dispute related communications.

The first and second data broker computers 160A, 160B may also communicate with the data exchange computer 120, which can facilitate the trading of data contracts between the various participants in the system. For example, the data brokers operating the data broker computers 160A, 160B may trade immutable commoditized data contracts between various data producers and data consumers through the data exchange computer 120. In some embodiments, the data brokers operating the data broker computers 160A, 160B may also communicate with the data producer operating the data producer computer 130 and the data consumer operating the data consumer computer 150 to discuss pricing information, buy orders, and/or contract terms for existing or future immutable commoditized data contracts. In some embodiments, the data brokers operating the data broker computers 160A, 160B may also be used to transfer funds between data producers, data consumers, or others that may have interests in the immutable commoditized data contracts, according to the terms in the immutable commoditized data contracts. For instance, the second data broker computer 160B may be operated by a second financial institution affiliated with the data consumer and may send funds associated with a data contract to the first data broker computer 160A, which may be operated by a first financial institution affiliated with the data producer. The funds may be sent via the data exchange computer 110 or directly between the data broker computers 160A, 160B.

Figure 2:
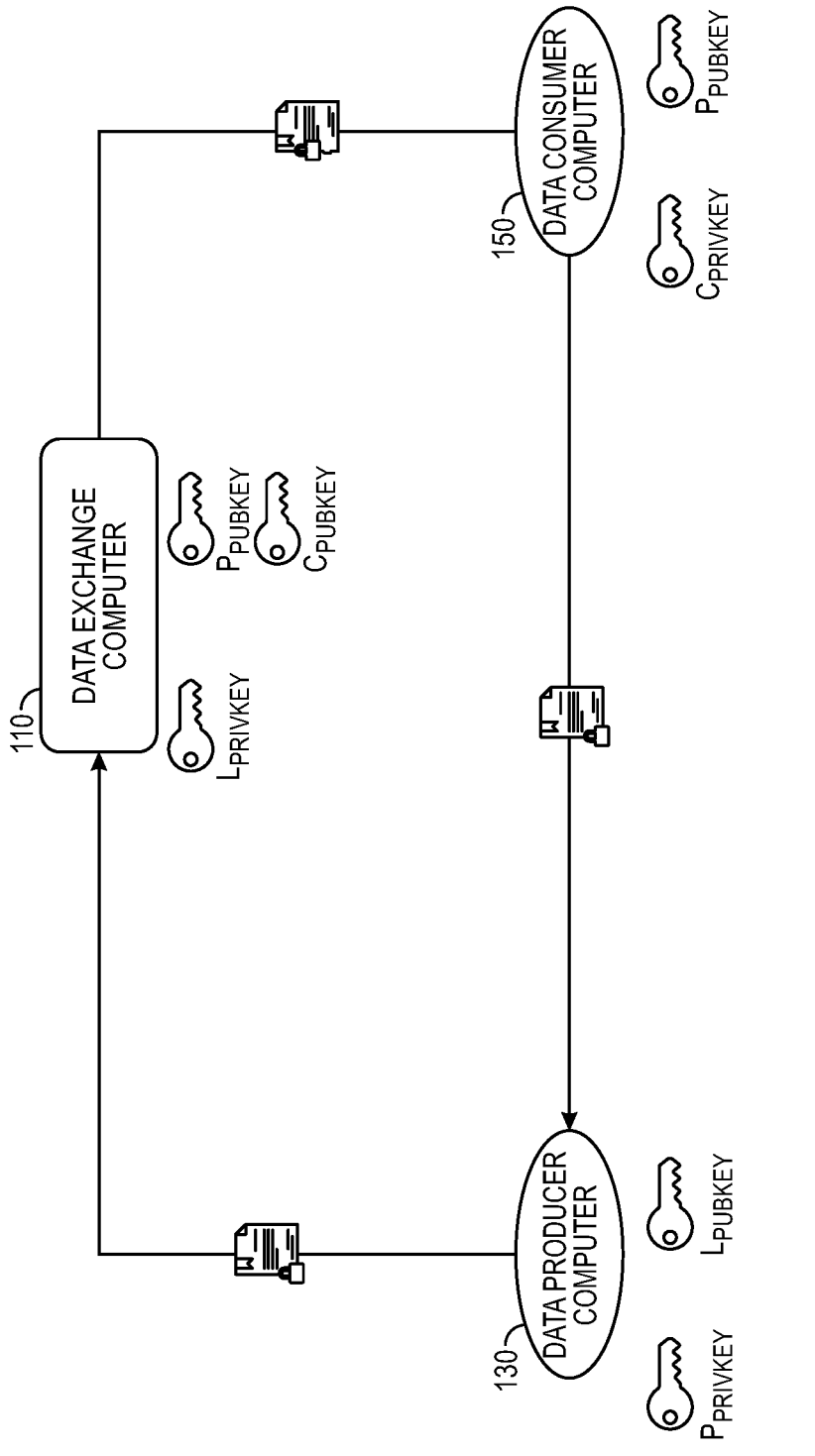
FIG. 2 shows a high-level block diagram illustrating components in a data exchange system according to embodiments of the invention.

FIG. 2 shows a diagram of a key management computer and a contract processing system according to embodiments of the invention. FIG. 2 shows a data producer computer 130 in communication with a data consumer computer 150. The data producer computer 130 and the data consumer computer 150 are in communication with the data exchange computer 110. FIG. 2 shows how the cryptographic keys on the various participants can be arranged prior to immutable commoditized data contract formation and processing.

As shown, the data exchange computer 110 may store a data exchange computer private key ($L_{PrivKey}$), and public keys for the data producer computer 130 ($P_{PubKey}$) and the data consumer computer 150 ($C_{PubKey}$). The data consumer computer 150 can store a public key of the data producer computer 130 ($P_{PubKey}$) and its own private key ($C_{PrivKey}$). The data producer computer 130 can store the public key of the data exchange computer 110 ($L_{PubKey}$) and its own private key ($P_{PrivKey}$). As noted above, each of the data exchange computer 110, the data producer computer 130, and the data consumer computer 150 can generates its own public private key pair, and each may distribute the corresponding public keys to the corresponding entities shown in FIG. 2.

Figure 3:
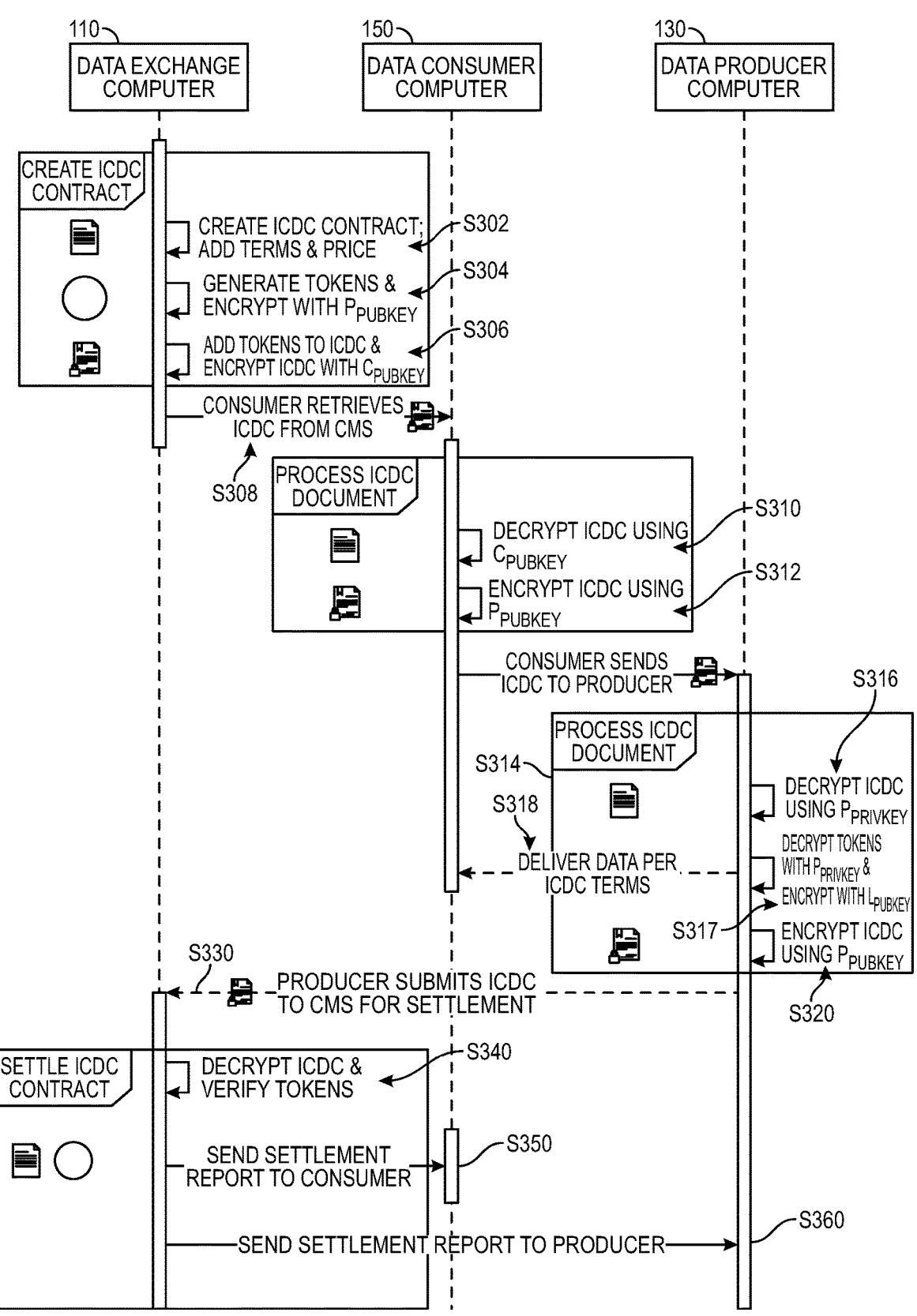
FIG. 3 shows a flow diagram illustrating a method according to an embodiment.

FIG. 3 shows a flow diagram illustrating methods according to embodiments of the invention. FIG. 3 shows a data exchange computer 110 in communication with a data consumer computer 150, and a data producer computer 130.

In step S302, the data exchange computer 110 can create an immutable commoditized data contract between the data producer operating the data producer computer 130 and the data consumer operating the data consumer computer 150. The information needed to create the immutable commoditized data contract may have been previously provided to the data exchange computer 110 by the data consumer operating the data consumer computer 150 and/or the data producer operating the data producer computer 130. For example, the data producer may be a utility company which operates smart meters in a residential area. The data consumer may be a solar company that wishes to receive the data from the smart meters. Such data could be used by the solar company to determine if solar panels on the homes in the residential area are operating properly and/or to determine if any of the homes would benefit from installing solar products such as solar panels. The utility company and the solar company in this example can each provide information regarding the terms of the immutable commoditized data contract to the data exchange computer 110 via user interfaces. Such user interfaces may allow for the immutable commoditized data contract to have standardized data fields.

Figure 4:
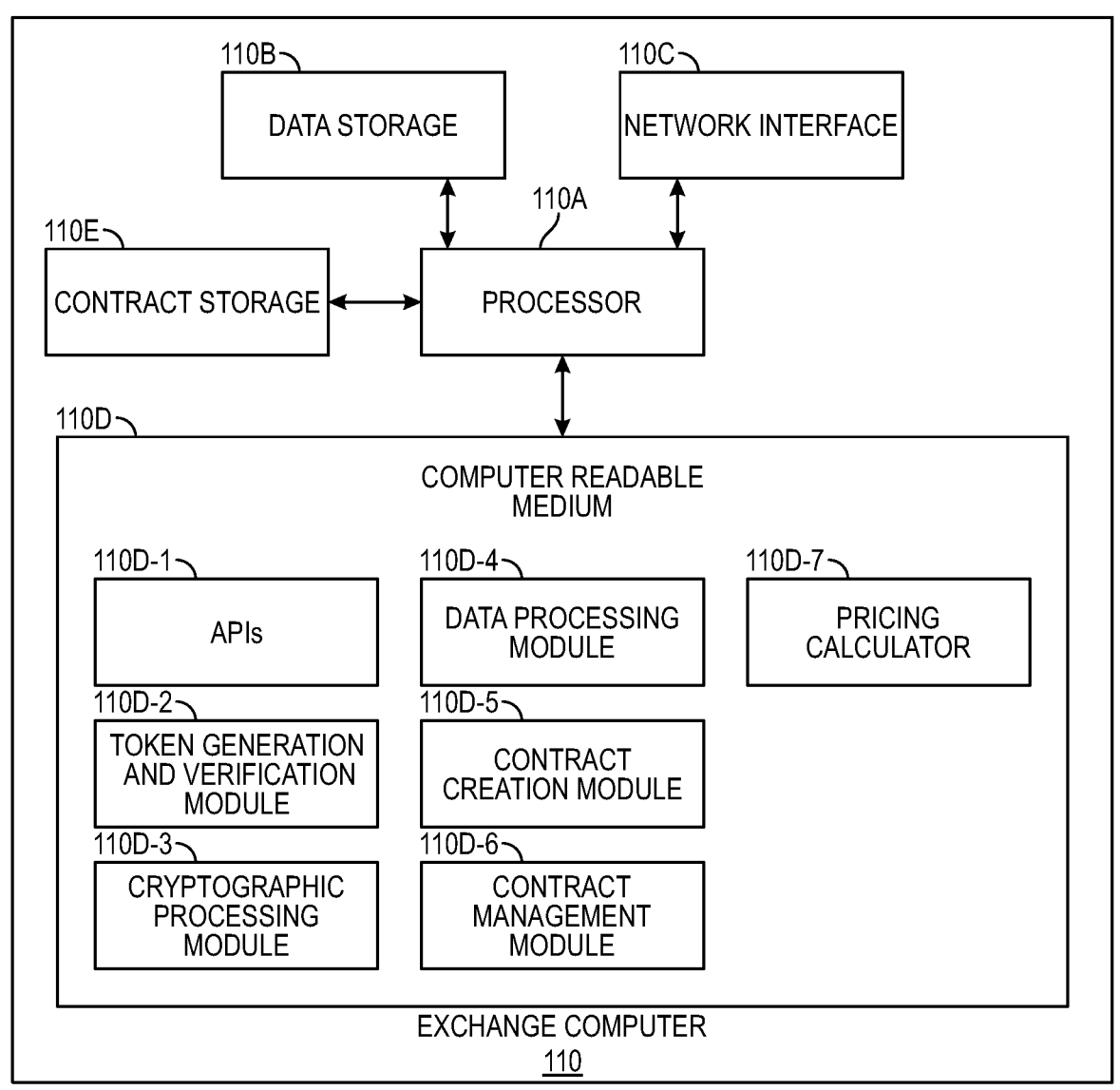
FIG. 4 shows a block diagram illustrating components of a data exchange computer according to an embodiment of the invention.

The immutable commoditized data contract may comprise any suitable number of data elements. Examples of data elements that may be present in an immutable commoditized immutable commoditized data contract are shown in FIG. 4. Such data elements include a contract type (e.g., the type of data that is the subject of the contract). An example of a contract type may be a contract for IoT (Internet of Things) sensor data. Other data elements may include contract identifier (ID), a contract name, a contract expiration date, and a contract version number. The immutable commoditized data contract may also comprise contact terms, pricing and execution instructions. The contract terms may include the length of the contract (e.g., 6 months), the type of feed frequency (e.g., real time), the privacy level, a pricing category, a contract cost or contract price (e.g., $1000), a pricing date, a data producer identifier, a data consumer identifier, and a link (e.g., a hyperlink) that can be used by the data consumer to obtain the data from the data producer, or a link to the data consumer that can be used by the data producer to provide the data. The immutable commoditized data contract may also comprise the tokens, as well as the public keys of the data exchange computer, the data producer computer, and the data consumer computer. The data contract may also specific certain tasks to be performed by the data producer computer, the data exchange computer, and the data consumer computer when verifying actions, clearing actions, and settling actions.

In an example, the immutable commoditized data contract may be for the purchase of road sensor data generated by road sensors operated by a data producer such as a county transportation agency to a data consumer such as a Website that provides real time traffic data to its subscribers. The immutable commoditized data contract can specify how the data will be delivered, the quantity of data to be delivered, the time frame in which the data is to be delivered, etc. The immutable commoditized data contract may have a unique identifier to identify it from other immutable commoditized data contracts that are being managed by the data exchange computer 110.

In step S304, one or more tokens can be generated, and they can be encrypted with a public key of the data producer computer 130 by the data exchange computer 110. The one or more tokens can be data that is uniquely generated by the data exchange computer 110 to prove the authenticity of the immutable commoditized data contract (i.e., that the immutable commoditized data contract was originally created by the data exchange computer 110). An example of a token may be a digital signature of the data exchange computer 110. The digital signature may be created by signing data such as the contract or any of the data in the contract with a private key of the data exchange computer 110.

In some embodiments, a token may be provided back to the data exchange computer 110 by the data producer computer 130 when the data producer wishes to initiate the settlement of the immutable commoditized data contract. For example, if an immutable commoditized data contract has many tokens associated with it, each token could be used to initiate the settlement of a portion of the total amount of the entire immutable commoditized data contract. For instance, if an immutable commoditized data contract specifies that data is to be delivered by the data producer to the data consumer for at regular intervals over a year, then a token may be returned by the data producer to the data exchange computer 110 every quarter to initiate a settlement process for a portion of the immutable commoditized data contract.

In step S306, the encrypted one or more tokens can be combined with the immutable commoditized data contract, and the immutable commoditized data contract and the token can be encrypted with a public key of the data consumer computer 150 to form a first encrypted immutable commoditized data contract.

In step S308, the data consumer computer 150 retrieves the first encrypted immutable commoditized data contract from the data exchange computer 110. The data exchange computer 110 transmits the encrypted immutable commoditized data contract to the data consumer computer 150.

In step S310, after receiving the first encrypted immutable commoditized data contract, the data consumer computer 150 can decrypt the first encrypted immutable commoditized data contract with a private key of the data consumer computer 150 to obtain the immutable commoditized data contract. The data consumer operating the data consumer computer 150 can then review the contents of the immutable commoditized data contract, and possibly assent to it (e.g., sign it with the private key of the data consumer computer 150).

In step S312, after the data consumer computer 150 reviews the immutable commoditized data contract and performs any desired processing, it can encrypt the immutable commoditized data contract with the public key of the data producer computer 130 to create a second encrypted immutable commoditized data contract. In some embodiments, the data consumer computer 150 can extract a link to the data producer computer 130 so that the data consumer computer 150 can retrieve the data from the data producer computer 130.

In step S314, the data consumer computer 150 can send the second encrypted immutable commoditized data contract and the previously encrypted token to the data producer computer 130.

In step S316, the data producer computer 130 can decrypt the second encrypted immutable commoditized data contract with the private key of the data producer computer 130 to obtain the immutable commoditized data contract. If the data consumer computer 150 did not obtain a link to obtain the data produced by the data producer computer 130, then the immutable commoditized data contract may contain a link to the data consumer computer 150. The data producer computer 130 could push data to the data consumer computer 150 according to the immutable commoditized data contract using the link.

In step S317, after the second encrypted immutable commoditized data contract decrypted by the data producer computer 130, the encrypted one or more tokens can be decrypted using the private key of the data producer computer 130. If the token includes a digital signature of the data exchange computer 110, then the digital signature can be verified by the data producer computer 130 with a public key of the data exchange computer 110. Once the token is verified by the data producer computer 130, the token can then be re-encrypted with the public key of the data exchange computer 110.

At step S318, data is delivered from the data producer computer 130 to the data consumer computer 150 pursuant to the terms of the immutable commoditized data contract. This can occur over a period of time. The data producer computer 130 can initiate providing the data to the data consumer computer 150 by providing the data directly to the data consumer computer 150, by providing the data consumer computer 150 with access to the requested data, and/or by providing the data to the data exchange computer 110 so that the data can be obtained by the data consumer computer 150.

In step S320, the immutable commoditized data contract is re-encrypted by the data producer computer 130 with the public key of the data exchange computer 110 to form a third encrypted immutable commoditized data contract.

In step S330, the data producer computer 130 submits the third encrypted immutable commoditized data contract and the encrypted token to the data exchange computer 110 for settlement.

In step S340, the data exchange computer 110 can decrypt the third encrypted contract and the encrypted token using the private key of the data exchange computer 110. The data exchange computer 110 can then verify that the token received is the token that was originally provided to the data consumer computer 150 in step S308.

Once the token is verified by the data exchange computer 110, the data exchange computer 150 can facilitate an action relating to the immutable commoditized data contract. For example, at step S350, a settlement report can be sent from the data exchange computer 110 to the data consumer computer 150. At step S350, a settlement report can be sent from the data exchange computer 110 to the data producer computer 130. Other actions can include the initiation of one or more payments between the parties to the data contract.

FIG. 4 shows a block diagram of an exchange computer 110 according to an embodiment. The exchange computer 110 may comprises a processor 110A. A computer readable medium 110D, a data storage 110B, a network interface 110C, and a contract storage 110E may be coupled to the processor 110.

The data storage 110B may store data from data producers. In some embodiments, the data produced by the data producers may be sent directly to the data consumers that they are contracting with. In other embodiments, the data producers may provide the data to the data exchange computer 110 and the data exchange computer 110 can temporarily store the data for the data producer.

The network interface 110C may include an interface that can allow the user device 400 to communicate with external computers. The network interface 406 may enable the user device 400 to communicate data to and from another device (e.g., a card, a resource provider computer, etc.). Some examples of the network interface 406 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 406 may include Wi-Fi™. Data transferred via the network interface 406 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 406 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The contract storage 110E can store data relating to contracts. The contract storage 110 can store the immutable commoditized data contracts, the parties to the contracts, the tokens associated with the contracts, and any other suitable data associated with the immutable commoditized data contracts. In some embodiments, the contract storage 110E can take the form of a central database. In other embodiments, the contract storage 110 can take the form of a public or private blockchain.

The computer readable medium 110D can comprises a number of software modules including APIs 110D-1, a token generation and verification module 110D-2, a cryptographic processing module 110D-3, a data processing mobile 110D-4, a contract creation module 110D-5, a contract management module 110D-6, and a pricing calculator 110D-7.

The APIs 110D-1 can be interfaces to various client computers including data producer computers, data consumer computers, and data broker computers.

The token generation and verification module 110D-2 can comprise code, executable by the processor 110A to generate tokens and verify them. The token can be verified by comparing the token that is received from a data producer computer to the token sent to a data consumer computer.

The cryptographic processing module 110D-3 can comprise code, executable by the processor 110A to encrypt, decrypt, or sign data.

The contract creation module 110D-5 can comprise code, executable by the processor 110A to create immutable commoditized data contracts.

The contract management module 110D-6 can comprise code, executable by the processor 110A to manage immutable commoditized data contracts. For example, in some embodiments, the immutable commoditized data contracts can be deleted once they have been settled and completed. In some embodiments, the contract management module 110D-6 and the processor 110A can facilitate the trading of the data contracts with a plurality of participants (e.g., data brokers).

The pricing calculator 110D-7 in conjunction with the processor 110A can be used to determine prices for data delivery prior to contract, or can be used to value immutable commoditized data contract for eventual trading. If for example, the market price of data in a data contract is much higher at the present time than at the time when an immutable commoditized data contract is formed, then the value of the immutable commoditized data contract may be higher than the value specified in the immutable commoditized data contract.

In some embodiments, the non-transitory computer readable medium comprises code, executable by the processor for performing operations comprising: transmitting a first encrypted data contract and one or more encrypted tokens to a data consumer computer, wherein the data consumer computer decrypts the first encrypted data contract with a private key of the data consumer computer to obtain a data contract, and encrypts the data contract with a public key of a data producer computer to create a second encrypted data contract, and transmits the second encrypted data contract and the encrypted one or more tokens to the data producer computer, wherein after receiving the second encrypted data contract and the encrypted one or more tokens, the data producer computer initiates providing data mentioned in the data contract to the data consumer computer, and the data producer computer decrypts the second encrypted data contract with the private key of the data producer computer to obtain the data contract, decrypts the encrypted one or more tokens with the private key of the data producer computer to obtain one or more tokens, encrypts the one or more tokens and encrypts the data contract with the public key of the data exchange computer to form a third encrypted data contract, and transmits the encrypted one or more tokens and the third encrypted data contract to the data exchange computer; receiving the encrypted one or more tokens and the third encrypted data contract; decrypting the third encrypted data contract and the encrypted one or more tokens with the private key of the data exchange computer; verifying the one or more tokens; and facilitating an action of the data contract.

In other embodiments, the non-transitory computer readable medium comprises code, executable by the processor for performing operations comprising generating a plurality of data contracts for a delivery of data, the plurality of data contracts executed between a plurality of data producers operating a plurality of data producer computers and a plurality of data consumers operating a plurality of data consumer computers, respectively, storing the plurality of data contracts; and facilitating trading of the plurality of data contracts with a plurality of participants interacting with the data exchange computer.

Embodiments of the invention have several advantages. For example, by using the particular encryption and transport scheme described herein, immutable commoditized data contract information is both protected during transaction and is also processed by the authorized parties who are in possession of the appropriate private keys. Embodiments of the invention can be well suited for the high-volume creation, exchange, and processing of immutable commoditized data contracts. The encryption scheme described above allows the immutable commoditized data contract to be used in any exchange computer, and not just a single specialized exchange computer.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

transmitting, by a data exchange computer via an API (application programming interface), a first encrypted data contract and one or more encrypted tokens to a data consumer computer;

decrypting, by the data consumer computer, the first encrypted data contract with a private key of the data consumer computer to obtain a data contract;

encrypting, by the data consumer computer, the data contract with a public key of a data producer computer to create a second encrypted data contract;

transmitting, by the data consumer computer, the second encrypted data contract and the encrypted one or more tokens to the data producer computer;

after receiving the second encrypted data contract and the encrypted one or more tokens, initiating providing data mentioned in the data contract by the data producer computer to the data consumer computer;

decrypting, by the data producer computer, the second encrypted data contract with the private key of the data producer computer to obtain the data contract;

decrypting, by the data producer computer, decrypts the encrypted one or more tokens with the private key of the data producer computer to obtain one or more tokens; encrypting, by the data producer computer, the one or more tokens;

encrypting, by the data producer computer, the data contract with the public key of the data exchange computer to form a third encrypted data contract;

transmitting, by the data producer computer, the encrypted one or more tokens and the third encrypted data contract to the data exchange computer;

receiving, by the data exchange computer, the encrypted one or more tokens and the third encrypted data contract;

decrypting, by the data exchange computer, the third encrypted data contract and the encrypted one or more tokens with the private key of the data exchange computer;

verifying, by the data exchange computer, the one or more tokens; and facilitating, by the data exchange computer, an action of the data contract.

2. The method of claim 1, further comprising:

creating, by the data exchange computer, the data contract between a data consumer operating the data consumer computer and a data producer operating the data producer computer;

creating, by the data exchange computer, the one or more tokens corresponding to the data contract;

encrypting, by the data exchange computer, the one of more tokens corresponding to the data contract using the public key of the data producer computer to form the one or more encrypted tokens; and encrypting, by the data exchange computer, the data contract using the public key of the data consumer computer to form the first encrypted data contract.

3. The method of claim 1, wherein the data contract specifies terms associated with the delivery of data from the data producer computer to the data consumer computer.

4. The method of claim 1, wherein the data producer computer delivers the data to the data consumer computer according to the data contract.

5. The method of claim 1, wherein facilitating the action of the data contract comprises providing, by the data exchange computer, a settlement report to the data consumer computer and the data producer computer.

6. The method of claim 1, wherein the data producer computer delivers data to the data consumer computer according to the data contract, wherein the data producer computer obtains the data from IoT sensors.

7. The method of claim 1, wherein verifying the one or more tokens comprises comparing the one or more tokens received from the data producer computer to the one or more tokens sent by the data exchange computer to the data consumer computer.

8. The method of claim 1, wherein the data producer computer delivers data to the data consumer computer according to the data contract, wherein the data producer computer obtains the data from IoT sensors, and wherein the IoT sensors comprises environmental sensors comprising one or more of road sensors, weather sensors, or temperature sensors.

9. The method of claim 1, wherein the data contract comprises a plurality of standardized data fields.

10. The method of claim 1, wherein the data exchange computer, the data consumer computer, and the data producer computer are in communication with each other using a public computer network.

11. A data exchange system comprising:

a data exchange computer comprising a first processor and a first non-transitory computer readable medium, the first non-transitory computer readable medium comprising first code, executable by the first processor for performing first operations comprising, transmitting, via an API (application programming interface), a first encrypted data contract and one or more encrypted tokens to a data consumer computer;

the data consumer computer comprising a second processor and a second non-transitory computer readable medium comprising second code, executable by the second processor for performing second operations comprising, decrypting the first encrypted data contract with a private key of the data consumer computer to obtain a data contract, encrypting the data contract with a public key of a data producer computer to create a second encrypted data contract, and transmitting the second encrypted data contract and the encrypted one or more tokens to the data producer computer; and the data producer computer, the data producer computer comprising a third processor and a third non-transitory computer readable medium, the third non-transitory computer readable medium comprising third code, executable by the third processor for performing third operations comprising providing data mentioned in the data contract to the data consumer computer, decrypting the second encrypted data contract with the private key of the data producer computer to obtain the data contract, decrypting the encrypted one or more tokens with the private key of the data producer computer to obtain one or more tokens, encrypting the one or more tokens and encrypting the data contract with the public key of the data exchange computer to form a third encrypted data contract, and transmitting the encrypted one or more tokens and the third encrypted data contract to the data exchange computer, wherein the first operations further comprise receiving the encrypted one or more tokens and the third encrypted data contract, decrypting the third encrypted data contract and the encrypted one or more tokens with the private key of the data exchange computer, verifying the one or more tokens, and facilitating an action of the data contract.

12. The data exchange system of claim 11, wherein the one or more tokens comprises one or more digital signatures by the data exchange computer.

13. The data exchange system of claim 11, wherein the data contract specifies terms associated with the delivery of data from the data producer computer to the data consumer computer.

14. The data exchange system of claim 11, further comprising one or more sensors, wherein the third operations further comprise delivering data to the data consumer computer according to the data contract, and obtaining the data from IoT sensors.

15. The data exchange system of claim 14, wherein the IoT sensors comprises environmental sensors comprising one or more of road sensors, weather sensors, or temperature sensors.

16. The data exchange system of claim 11, wherein the data producer computer stores the private key of the data producer computer.

17. The data exchange system of claim 11, wherein the data consumer computer stores the private key of the data consumer computer.

18. The method of claim 1, wherein the data contract comprises a contract identifier, a contract expiration date, a description of a type of data to be delivered to the data consumer computer, and a contract price.

19. The method of claim 1, wherein the action comprises sending a settlement report from the data exchange computer to the data consumer computer.

20. The method of claim 1, wherein the action comprises facilitating payment between parties to the data contract.

* * * * *